United States Patent
Iinuma (10) Patent No.: US 10,447,904 B2
(45) Date of Patent: Oct. 15, 2019

(54) LENS MOUNT FOR USE IN ATTACHMENT/REMOVAL OF INTERCHANGEABLE LENS, INTERCHANGEABLE LENS, AND IMAGE PICKUP APPARATUS

(71) Applicant: CANON KABUSHIKI KAISHA, Tokyo (JP)

(72) Inventor: Futoshi Iinuma, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 278 days.

(21) Appl. No.: 15/427,389

(22) Filed: Feb. 8, 2017

(65) Prior Publication Data

US 2017/0230553 A1 Aug. 10, 2017

(30) Foreign Application Priority Data

Feb. 10, 2016 (JP) .................. 2016-023598

(51) Int. Cl.
*H04N 5/225* (2006.01)
*G02B 7/14* (2006.01)

(52) U.S. Cl.
CPC ............. *H04N 5/2254* (2013.01); *G02B 7/14* (2013.01)

(58) Field of Classification Search
CPC .......... H04N 5/2254; G02B 7/14; G02B 7/00; G02B 7/027; G03B 17/14
USPC ....................................................... 359/828
See application file for complete search history.

(56) References Cited

U.S. PATENT DOCUMENTS

2012/0195587 A1 8/2012 Hasuda
2013/0265664 A1* 10/2013 Iinuma ................. G02B 7/14
359/828

FOREIGN PATENT DOCUMENTS

JP 2004-102005 A 4/2004
JP 2013-218150 A 10/2013
WO 2016/053476 A1 4/2016

OTHER PUBLICATIONS

A U.K. Search Report dated Jul. 3, 2017, that issued in the corresponding U.K. Patent Application No. 1702120.5.

* cited by examiner

*Primary Examiner* — William R Alexander
*Assistant Examiner* — Henry A Duong
(74) *Attorney, Agent, or Firm* — Cowan, Liebowitz & Latman, P.C.

(57) ABSTRACT

A lens mount capable of suppressing play of an interchangeable lens against a camera body. The lens mount of the interchangeable lens includes a fixed mount part having a female screw portion, a movable mount part having a male screw portion, and an arm part protruding from the movable mount part. When the movable mount part is rotated about an optical axis by turning the arm part about the optical axis from a state where a mount surface of the camera body and a lens-side mount surface of the fixed mount part are in contact and a bayonet-lug portion of the camera body and a lug portion of the movable mount part do not overlap on an optical axis projection, the movable mount part moves toward the fixing portion in the optical axis direction, as the male screw portion is screwed with the female screw portion.

9 Claims, 8 Drawing Sheets

LENS MOUNT FOR USE IN ATTACHMENT/REMOVAL OF INTERCHANGEABLE LENS, INTERCHANGEABLE LENS, AND IMAGE PICKUP APPARATUS

BACKGROUND OF THE INVENTION

Field of the Invention

The present invention relates to the structure of a lens mount that enables attachment/removal of an interchangeable lens to/from an image pickup apparatus body.

Description of the Related Art

Image pickup apparatuses are known to which various interchangeable lenses, such as a single-focus lens, a zoom lens, a wide-angle lens, a telephoto lens, and a macro lens, can be removably attached so as to enable photographing to be performed while changing an angle of view, a focal depth, an F value, etc. in accordance with a scene to be photographed. As a lens mount method for removably attaching an interchangeable lens to an image pickup apparatus body, a bayonet-type lens mount is widely used. The bayonet-type lens mount generally has a lug portion formed on a mount surface of an image pickup apparatus body, and a lug portion is also formed on a mount surface of an interchangeable lens. When attaching the interchangeable lens to the image pickup apparatus body, the interchangeable lens and the image pickup apparatus body are rotated about an optical axis of the interchangeable lens relative to each other with each other's mount surfaces held in contact, whereby the two lug portions are fitted to each other. At this time, a spring member provided in the image pickup apparatus body urges the lug portion of the interchangeable lens into the image pickup apparatus body to thereby urge the interchangeable lens against the image pickup apparatus body, whereby the interchangeable lens is held on the image pickup apparatus body (see Japanese Patent Laid-Open Publication No. 2004-102005).

However, since the conventional bayonet-type lens mount holds an interchangeable lens by the urging force of the spring member, the interchangeable lens has a play corresponding to the amount of deformation of the spring member. Particularly when a large-sized interchangeable lens is attached to an image pickup apparatus body, the interchangeable lens is liable to have a play in a coupling portion between the interchangeable lens and the image pickup apparatus body, which can cause degradation of the image quality of a photographed image.

SUMMARY OF THE INVENTION

The present invention provides a lens mount which is capable of suppressing the play of an interchangeable lens in a state attached to an image pickup apparatus body.

In a first aspect of the invention, there is provided a lens mount provided in an interchangeable lens as arranged to enable the removable attachment of the interchangeable lens to an image pickup apparatus body including a bayonet-lug portion, the lens mount comprising a fixed mount part including a lens-side mount surface arranged to contact a mount surface formed on the image pickup apparatus body and a first screw portion, and configured to be fixed to a fixing portion provided on the interchangeable lens, and a movable mount part including a lug portion arranged to engage with the bayonet-lug portion and a second screw portion arranged to cooperate with the first screw portion, wherein when the movable mount part is rotatable from a state in which the mount surface and the lens-side mount surface are in contact with each other and the bayonet-lug portion and the lug portion do not overlap each other, the movable mount part moves toward the fixing portion, as the second screw portion cooperates with the first screw portion, whereby the lug portion is brought into engagement with the bayonet-lug portion.

In a second aspect of the invention, there is provided an interchangeable lens including the lens mount as the first aspect of the invention, and a barrel to which the lens mount is fixed.

In a third aspect of the invention, there is provided an image pickup apparatus including an image pickup apparatus body including a bayonet-lug portion and a mount part having a mount surface, and the interchangeable lens as the second aspect of the invention.

According to the invention, it is possible to suppress the play of an interchangeable lens in a state attached to an image pickup apparatus body.

Further features of the present invention will become apparent from the following description of exemplary embodiments (with reference to the attached drawings). Each of the embodiments of the present invention described below can be implemented solely or as a combination of a plurality of the embodiments or features thereof where necessary or where the combination of elements or features from individual embodiments in a single embodiment is beneficial.

DESCRIPTION OF THE EMBODIMENTS

Figure 1:
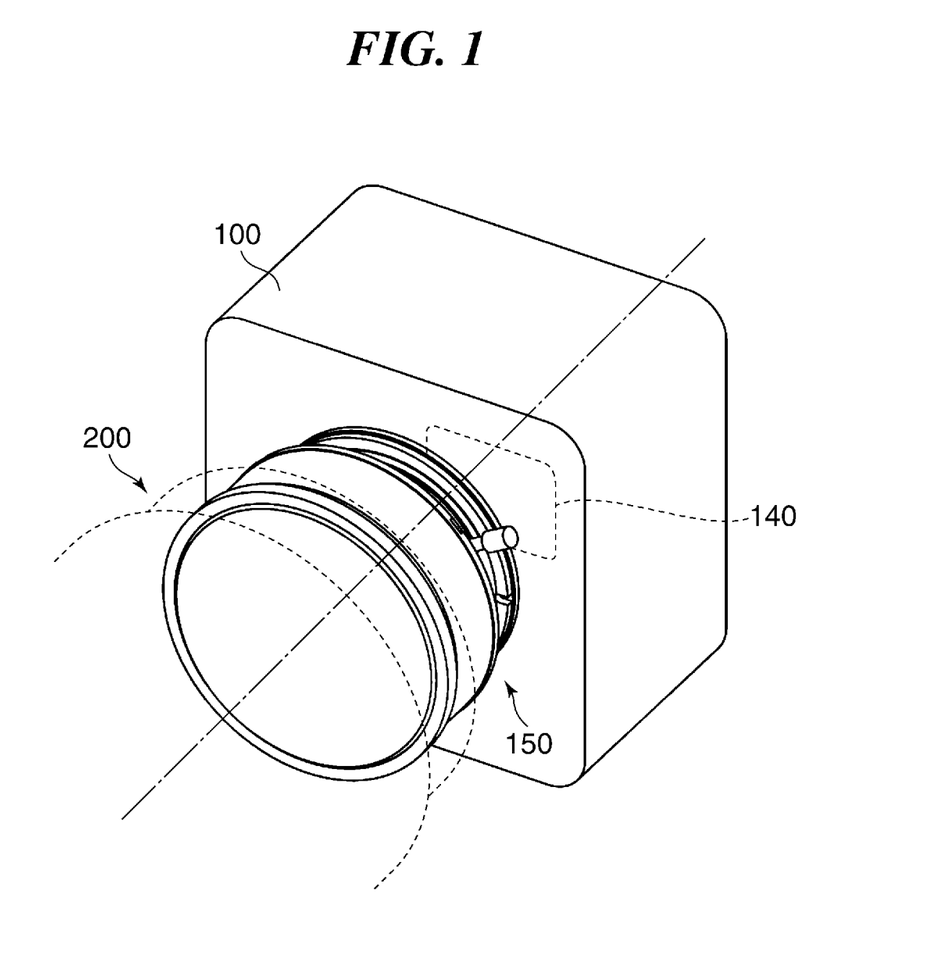
FIG. 1 is a schematic perspective view of an image pickup apparatus according to an embodiment of the invention.

The present invention will now be described in detail below with reference to the accompanying drawings showing an embodiment thereof. FIG. 1 is a schematic perspective view of an image pickup apparatus according to the embodiment. The image pickup apparatus is comprised of an image pickup apparatus body 100 (hereinafter referred to as "the camera body 100") equipped with an image pickup device 140 and an interchangeable lens 200 removably attached to the camera body 100. The interchangeable lens 200 has a lens mount 150 for removably attaching the interchangeable lens 200 to the camera body 100. Note that most parts of the interchangeable lens 200 are not shown in FIG. 1. The type of the interchangeable lens 200 is not limitative, but advantageous effects, described hereinafter, provided by the lens mount 150 are more remarkable as the interchangeable lens 200 is a larger-sized one (i.e. a larger and/or heavier one).

Figure 2:
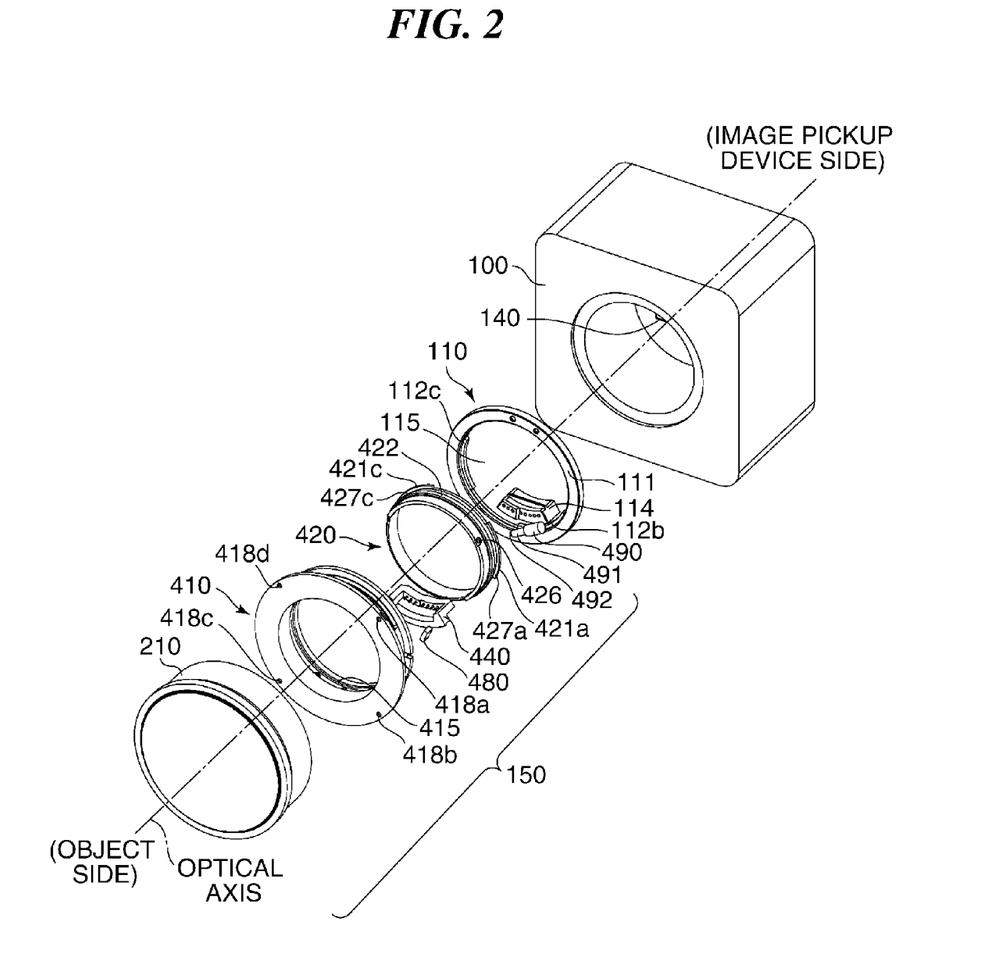
FIG. 2 is an exploded perspective view showing the structure of a coupling portion between a camera body and an interchangeable lens appearing in FIG. 1, as viewed from an object side.
Figure 3:
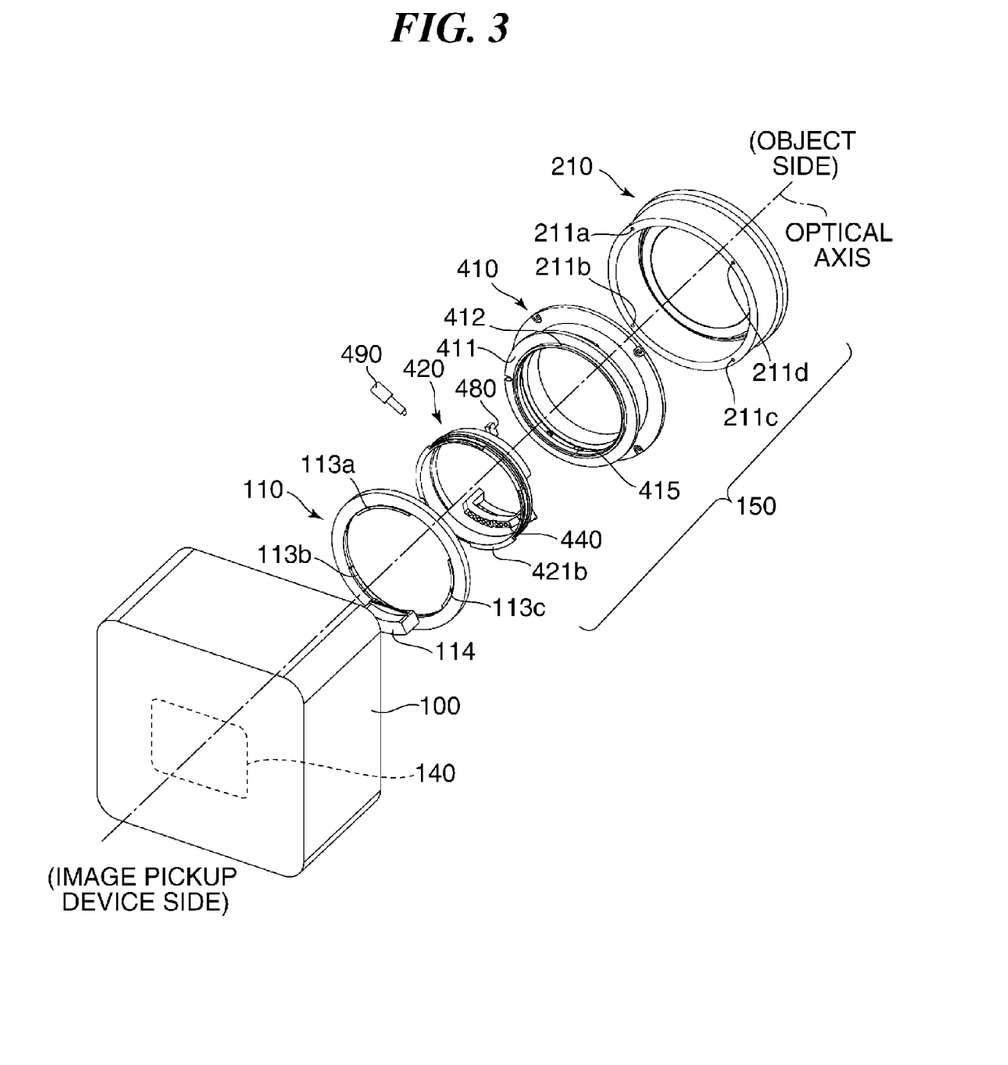
FIG. 3 is an exploded perspective view showing the structure of the coupling portion between the camera body and the interchangeable lens appearing in FIG. 1, as viewed from a camera body side.
Figure 4A:
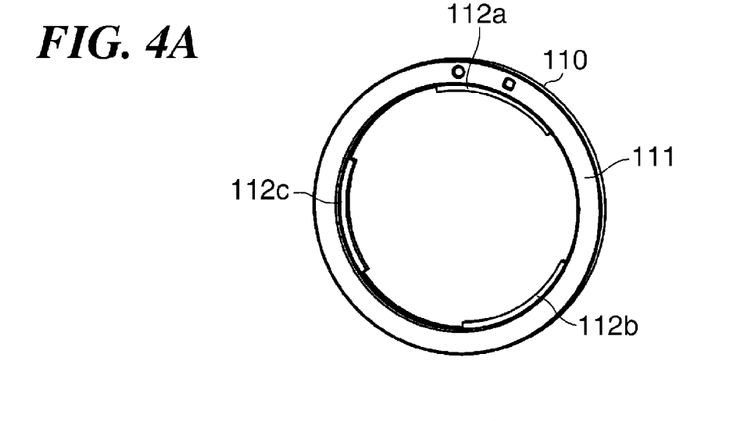
FIG. 4A is a schematic front perspective view of a mount part of the camera body appearing in FIG. 1.
Figure 4B:
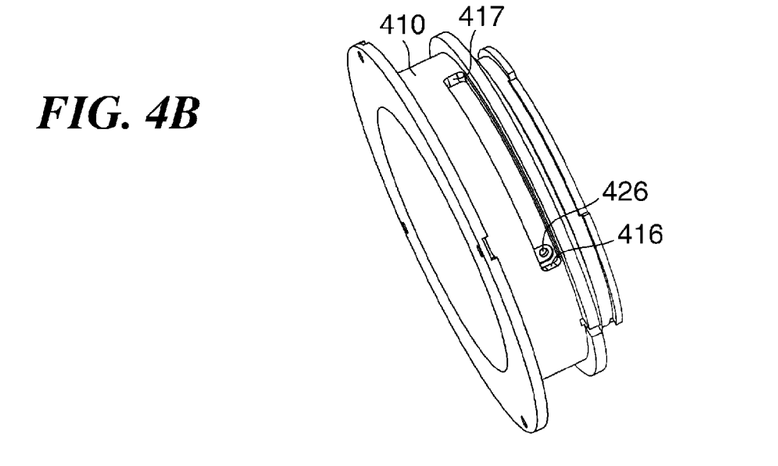
FIG. 4B is a schematic perspective view of a movable mount part and a fixed mount part of the interchangeable lens.
Figure 4C:
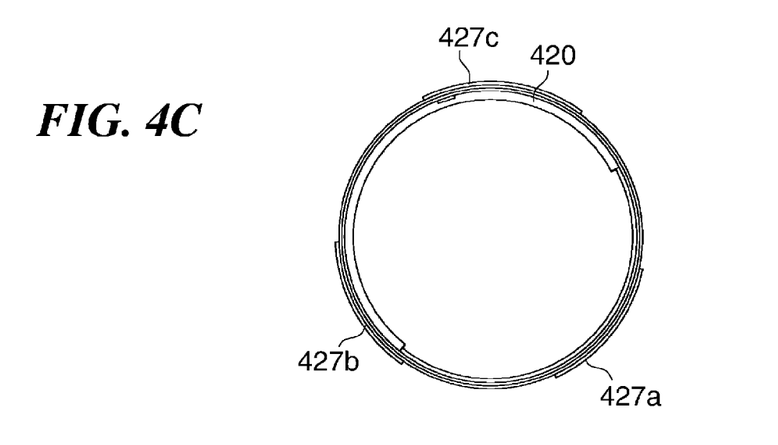
FIG. 4C is a front view of the movable mount part of the interchangeable lens.

FIG. 2 is an exploded perspective view showing the structure of a coupling portion between the camera body 100 and the interchangeable lens 200, as viewed from an object side. FIG. 3 is an exploded perspective view showing the structure of the coupling portion between the camera body 100 and the interchangeable lens 200, as viewed from a camera body side. FIG. 4A is a schematic front perspective view (perspective view as viewed from the object side) of a camera-side mount part 110 which is provided in the camera body 100. FIG. 4B is a schematic perspective view of a movable mount part 420 and a fixed mount part 410 of the interchangeable lens 200. FIG. 4C is a front view (view as viewed from the object side) of the movable mount part 420 of the interchangeable lens 200.

On the rear side of the interchangeable lens 200, there is provided the lens mount 150 for removably attaching the interchangeable lens 200 to the camera body 100. On the other hand, in the camera body 100, there is provided the camera-side mount part 110 to which the lens mount 150 of the interchangeable lens 200 is removably attached. The camera-side mount part 110 is comprised of a camera-side mount surface 111, bayonet-lug portions 112a, 112b, and 112c, and an opening 115. The bayonet-lug portions 112a, 112b, and 112c have respective bayonet-lug contact surfaces 113a, 113b, and 113c. In a state where the camera-side mount part 110 is fixed to the camera body 100, a first communication contact component 114 for bi-directional electrical communication with the interchangeable lens 200 is fixed to the camera body 100 in a manner held in contact with the camera-side mount part 110.

The lens mount 150 provided in the interchangeable lens 200 is comprised of a fixing part 210, the fixed mount part 410, a movable mount part 420, an arm part 490, a second communication contact component 440, and a rotation detection part 480. The fixing part 210 is fixed to a lens barrel, not shown, which holds optical components, such as convex lenses and concave lenses, of the interchangeable lens 200, and is coupled to the fixed mount part 410. The fixing part 210 has fastening portions 211a, 211b, 211c, and 211d, and each of the fastening portions 211a to 211d is tapped for fastening with a screw. The second communication contact component 440 and the rotation detection part 480 are fixed to the fixed mount part 410. The function of the second communication contact component 440 and that of the rotation detection part 480 will be described hereinafter.

The fixed mount part 410 is comprised of a lens-side mount surface 411, a cylindrical portion 412, a female screw portion 415 (first screw portion), through holes 418a, 418b, 418c, and 418d, and a first contact surface 416 and a second contact surface 417. The lens-side mount surface 411 is brought into contact with the camera-side mount surface 111 of the camera-side mount part 110 when the interchangeable lens 200 is attached to the camera body 100. The cylindrical portion 412 is inserted through the opening 115 of the camera-side mount part 110. The female screw portion 415 is screwed with a male screw portion 422, referred to hereinafter, of the movable mount part 420. A screw is inserted through each of the through holes 418a to 418d, and the screws are fastened to the respective fastening portions 211a to 211d of the fixing part 210, whereby the fixed mount part 410 is fixed to the fixing part 210. The first contact surface 416 and the second contact surface 417 are opposite side surfaces of respective longitudinal ends of a groove portion formed in a manner extending with a predetermined width along the circumference of the fixed mount part 410. The first contact surface 416 and the second contact surface 417 play the role of restricting a turning angle of the arm part 490 (i.e. the rotational angle of the movable mount part 420).

The movable mount part 420 is comprised of lug portions 421a, 421b, and 421c, the male screw portion 422 (second screw portion), and a fastening portion 426. The lug portions 421a, 421b, and 421c are engaged with the respective bayonet-lug portions 112a, 112b, and 112c of the camera-side mount part 110, and have respective lug contact surfaces 427a, 427b, and 427c for contact with the respective bayonet-lug contact surfaces 113a, 113b, and 113c, for engagement with the respective bayonet-lug portions 112a, 112b, and 112c. The male screw portion 422 is screwed with the female screw portion 415 of the fixed mount part 410, as mentioned above. The arm part 490 is provided in a manner protruding from the movable mount part 420 in a direction orthogonal to an optical axis in a state inserted through the groove portion formed in the fixed mount part 410. This makes the arm part 490 turnable along the length of the groove portion formed in the fixed mount part 410. The arm part 490 has an arm-part contact surface 491 and a screw portion 492. The screw portion 492 is fastened to the fastening portion 426, whereby the arm part 490 is fixed to the movable mount part 420. Note that the fastening portion 426 is tapped for screwing with the screw portion 492. The arm-part contact surface 491 has a cylindrical shape. The function of the arm-part contact surface 491 will be described hereinafter.

Figure 5:
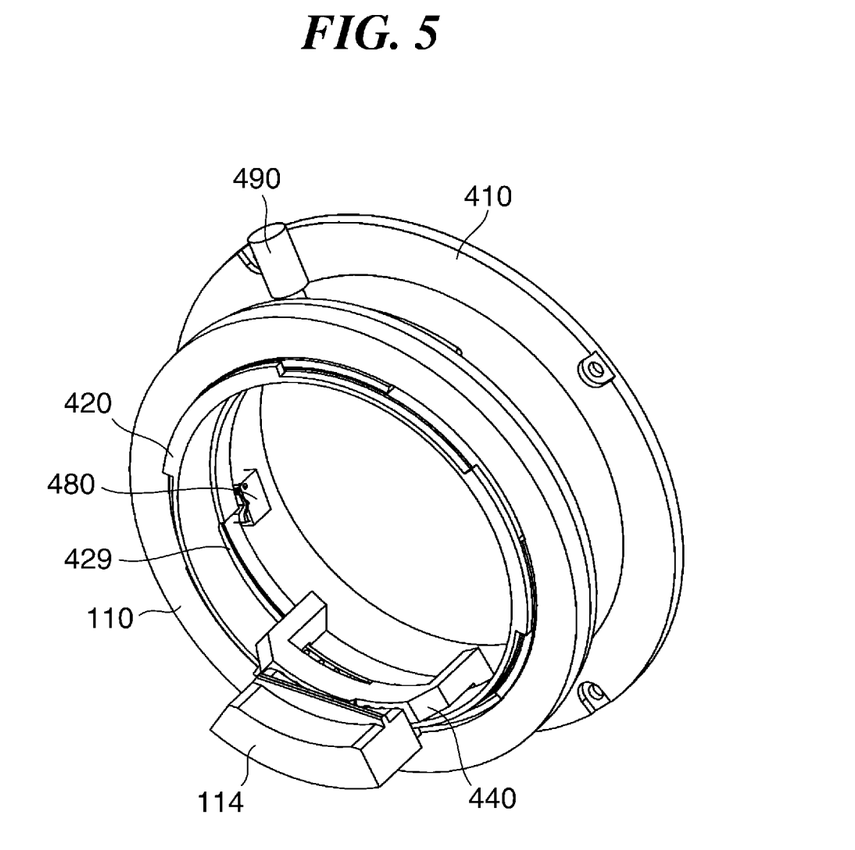
FIG. 5 is a perspective view showing component elements of a lens mount of the interchangeable lens, as viewed from a side of an attachment surface of the same for removable attachment to the camera body.

FIG. 5 is a perspective view showing component elements of the lens mount 150, as viewed from a side of an attachment surface of the same for removable attachment to the camera body 100. When the interchangeable lens 200 is attached to the camera body 100, the first communication contact component 114 fixed to the camera body 100 and the second communication contact component 440 provided in the lens mount 150 of the interchangeable lens 200 are held in contact with each other with a fixed force for conduction therebetween. This causes electric power to be supplied from the camera body 100 to the interchangeable lens 200, thereby enabling transmission/reception of a control signal between the interchangeable lens 200 and the camera body 100. Note that the second communication contact component 440 is fixed to the fixed mount part 410. The rotation detection part 480 switches on/off communication between the first communication contact component 114 and the second communication contact component 440 by a cutout portion 429 formed in the movable mount part 420.

Figure 6A:
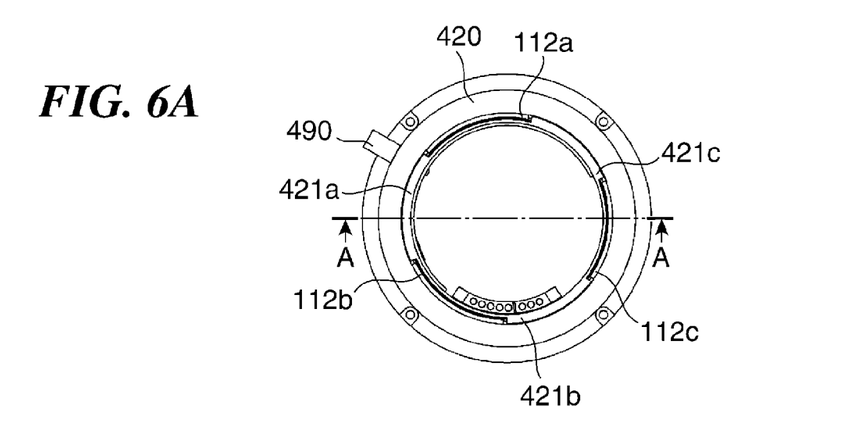
FIGS. 6A to 6C are rear views showing how each of the component elements of the lens mount moves with time relative to the camera-side mount part when attaching the interchangeable lens to the camera body.
Figure 6B:
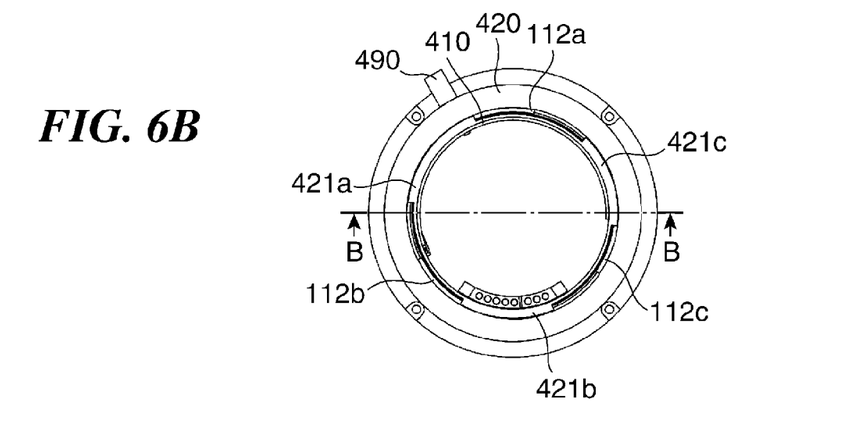
Figure 6C:
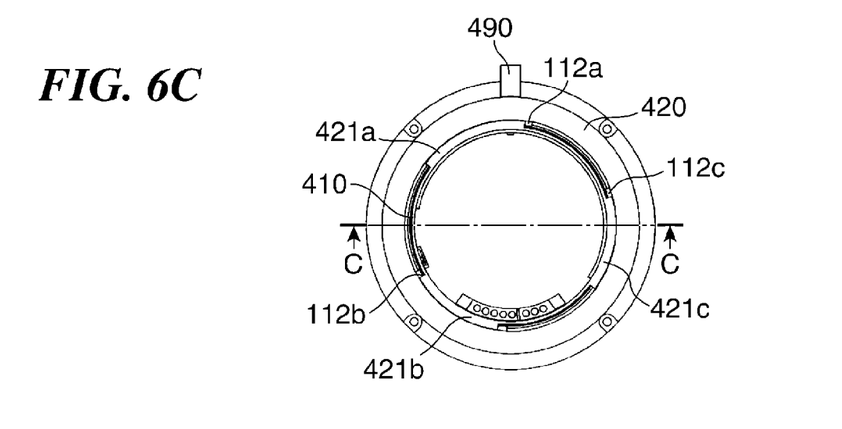
Figure 7A:
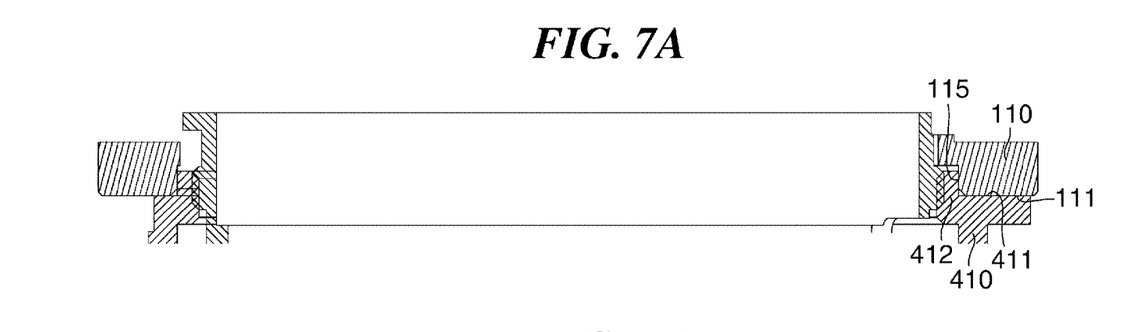
FIGS. 7A to 7C are cross-sectional views corresponding to FIGS. 6A to 6C, respectively.
Figure 7B:
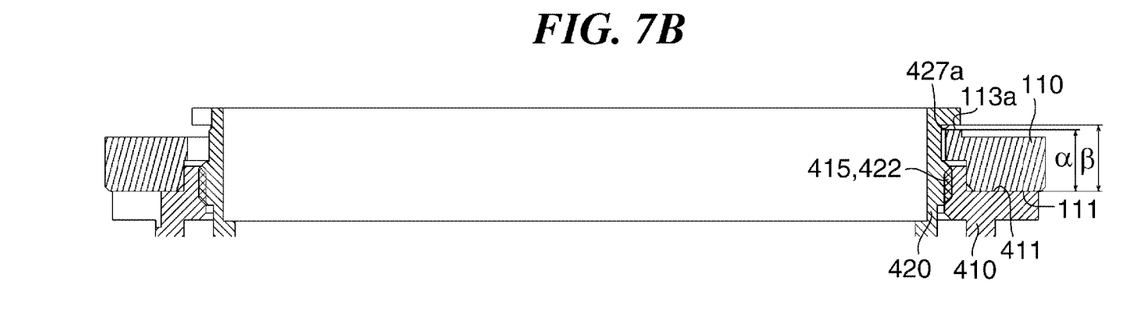
Figure 7C:
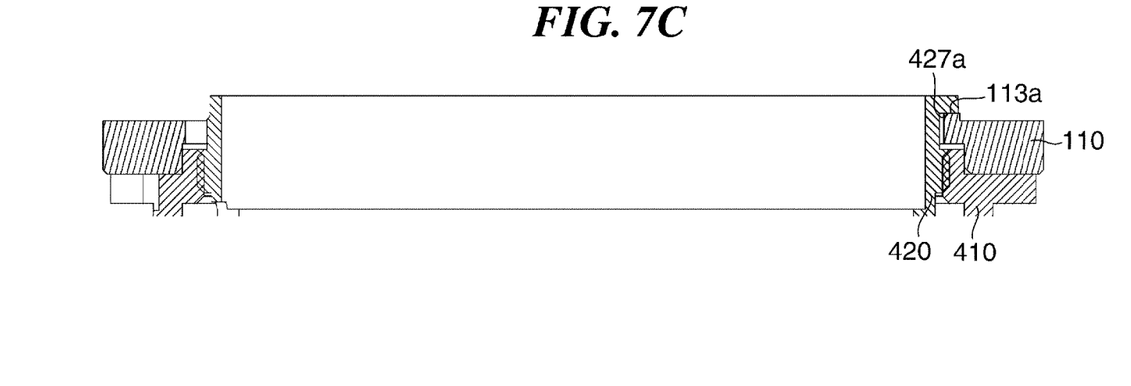

Next, a description will be given of how the component elements of the lens mount 150 and those of the camera-side mount part 110 move when attaching the interchangeable lens 200 to the camera body 100. FIGS. 6A to 6C are rear views (views as viewed from an image pickup device side) showing how the component elements of the lens mount 150 move with time relative to the camera-side mount part 110 when attaching the interchangeable lens 200 to the camera body 100. FIGS. 7A to 7C are cross-sectional views corresponding to FIGS. 6A to 6C, respectively.

FIG. 6A shows a state where an operation for attaching/removing the interchangeable lens 200 to/from the camera body 100 can be performed. FIG. 7A is a cross-sectional view taken along arrows A-A in FIG. 6A. When attaching the interchangeable lens 200 to the camera body 100, the cylindrical portion 412 of the interchangeable lens 200 is inserted through the opening 115 of the camera-side mount part 110 to thereby bring the camera-side mount surface 111 of the camera body 100 and the lens-side mount surface 411 into contact with each other. More specifically, the lens mount 150 of the interchangeable lens 200 is fitted into the camera-side mount part 110 such that the lug portions 421a to 421c of the movable mount part 420 do not overlap the respective bayonet-lug portions 112a to 112c of the camera-side mount part 110 when viewed from the optical axis direction. Therefore, in the FIG. 6A state, the bayonet-lug portions 112a to 112c of the camera-side mount part 110 and the lug portions 421a to 421c of the movable mount part 420 do not overlap, respectively, on an optical axis projection.

FIG. 6B shows a state where the movable mount part 420 has been rotated clockwise, as viewed from the image pickup device side, about the optical axis through a predetermined angle relative to the fixed mount part 410. Note that the method of rotating the movable mount part 420 will be described hereinafter. FIG. 7B is a cross-sectional view taken along arrows B-B in FIG. 6B. Since the female screw portion 415 of the fixed mount part 410 and the male screw portion 422 of the movable mount part 420 have been screwed with each other, the lug portions 421a to 421c of the movable mount part 420 move toward the fixing part 210 along the optical axis in accordance with rotation of the movable mount part 420. Accordingly, in the FIG. 6B state, the bayonet-lug portions 112a to 112c of the camera-side mount part 110 have partially overlapped the respective lug portions 421a to 421c on the optical axis projection. Now, a distance between the camera-side mount surface 111 and the bayonet-lug contact surface 113a of the camera-side mount part 110 is referred to as "distance α" as shown in FIG. 7B. Further, a distance between the lens-side mount surface 411 of the fixed mount part 410 and the lug contact surface 427a of the movable mount part 420 is referred to as "distance β". In the FIG. 7B state where coupling of the lens mount 150 to the camera-side mount part 110 has not been completed, distance α<distance β holds, which means that a gap is formed between the bayonet-lug contact surface 113a and the lug contact surface 427a.

FIG. 6C shows a state where the rotation of the movable mount part 420 about the optical axis has been completed. FIG. 7C is a cross-sectional view taken along arrows C-C in FIG. 6C. When the rotation of the movable mount part 420 is completed, the lug contact surfaces 427a to 427c of the lug portions 421a to 421c of the movable mount part 420 are held in contact (intimate contact) with the respective bayonet-lug contact surfaces 113a to 113c of the bayonet-lug portions 112a to 112c of the camera-side mount part 110. More specifically, distance α=distance β holds, which means that there is no gap between the bayonet-lug contact surface 113a and the lug contact surface 427a, and the camera-side mount part 110 is firmly sandwiched between the movable mount part 420 and the fixed mount part 410 in the optical axis direction. Thus, the interchangeable lens 200 is coupled to the camera body 100 without a play in a state enabling photographing.

Now, the lens mount 150 of the interchangeable lens 200 will be compared with conventional lens mounts, not shown.

As for a conventional screw-type lens mount, it is required to extend a lens-side mount surface of an interchangeable lens to thereby form surfaces which play the roles of the lug contact surfaces 427a to 427c of the movable mount part 420 and the bayonet-lug contact surfaces 113a to 113c of the camera-side mount part 110. For this reason, the screw-type lens mount is unsuitable for reduction of the size of the interchangeable lens. On the other hand, as for a conventional bayonet-type lens mount, a gap is formed between an interchangeable lens-side lug contact surface and an image pickup apparatus-side bayonet-lug contact surface when the rotation of an interchangeable lens is completed, and hence the lens mount of the interchangeable lens is pushed against a mount part of an image pickup apparatus body by a spring member. However, the use of the spring member causes the interchangeable lens to have a play corresponding to the amount of deformation of the spring member.

In contrast, according to the present embodiment, when the lens mount 150 is coupled to the camera-side mount part 110, no gap is formed between the lug contact surfaces 427a to 427c of the movable mount part 420 and the bayonet-lug contact surfaces 113a to 113c of the camera-side mount part 110. In other words, the lens mount 150 of the interchangeable lens 200 has a structure for reliably fixing the interchangeable lens 200 in an inner periphery of the lens-side mount surface 411 thereof with respect to the camera body 100. Therefore, the interchangeable lens 200 can be made smaller in size than when the screw-type lens mount is adopted. Further, differently from a case where the conventional bayonet-type lens mount is adopted, no play occurs between the interchangeable lens 200 and the camera body 100.

In the lens mount 150, each of the male screw portion 422 and the female screw portion 415 can be formed as a right-hand screw with a screw feed amount of 2 mm and a screw pitch of 1 mm, for example. Note that if the direction in which the arm part 490 is turned for attachment of the interchangeable lens 200 to the camera body 100 is clockwise as viewed from the camera body side, each of the male screw portion 422 and the female screw portion 415 is "right-hand screw", whereas if the direction is counterclockwise, each of the male screw portion 422 and the female screw portion 415 is "left-hand screw". By increasing the screw feed amount of the male screw portion 422 and the female screw portion 415, it is possible to move the fixed mount part 410 farther in the optical axis direction with a small amount of rotation operation of the movable mount part 420 (i.e. a small amount of turning operation of the arm part 490). More specifically, by increasing the amount of screw feed of each of the male screw portion 422 and the female screw portion 415, the distance β over which the fixed mount part 410 is moved is increased relative to the amount of rotation operation of the movable mount part 420. For example, even in a case where the distance α varies due to a difference between individual camera-side mount parts 110, the interchangeable lens 200 can be reliably coupled to the camera body 100 by setting the screw feed amount such that the fixed mount part 410 is moved over a distance exceeding the variation with a small amount of rotation operation of the movable mount part 420. Inversely, by reducing the screw feed amount, it is possible to increase tightening axial force. Therefore, if it is desired to increase tightening axial force to be exerted when the interchangeable lens 200 is attached to the camera body 100, it is desirable to reduce the screw feed amount. The screw feed amount is set by taking into account the required characteristics and balance between them.

Further, by increasing the number of threads for screwing in each of the male screw portion 422 and the female screw portion 415, it is possible to disperse stress concentrated on the male screw portion 422 and the female screw portion 415. Therefore, in order to increase the number of threads for screwing in a small space and obtain reliable coupling and a large tightening axial force, it is desirable to use a multiple start screw having a small screw pitch and a large screw feed amount. Note that slide grease is applied between the male screw portion 422 and the female screw portion 415, which makes it possible to reduce roughness during sliding rotation of the male screw portion 422 and the female screw portion 415 and improve durability and slidability of the screw portions.

FIGS. 8A to 8E are front views showing how the arm part 490 moves with time so as to rotate the movable mount part 420 when attaching the interchangeable lens 200 to the camera body 100. Each of angles θa to θe appearing in FIGS. 8A to 8E, respectively, shows an angle of the arm part 490 with respect to a horizontal axis (hereinafter simply referred to as "the angle of the arm part 490").

Figure 8A:
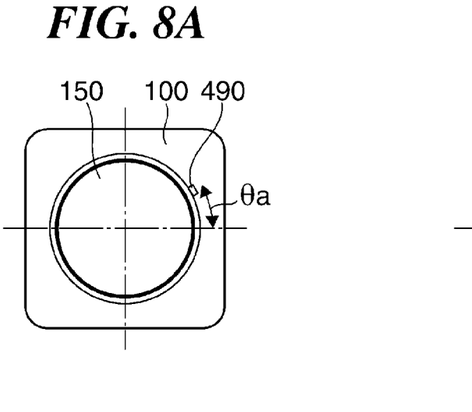
FIGS. 8A to 8E are front views showing how an arm part moves with time when attaching the interchangeable lens to the camera body.

FIG. 8A shows a state where the bayonet-lug portions 112a to 112c of the camera-side mount part 110 do not overlap the respective lug portions 421a to 421c of the movable mount part 420 on the optical axis projection, i.e. the same state as shown in FIG. 6A. At this time, the interchangeable lens 200 can be attached/removed to/from the camera body 100, and the first contact surface 416 (see FIG. 4B) of the fixed mount part 410 and the arm-part contact surface 491 of the arm part 490 are in contact with each other. The angle θa of the arm part 490 is a parameter indicative of an initial state of the movable mount part 420 with respect to the fixed mount part 410.

Figure 8B:
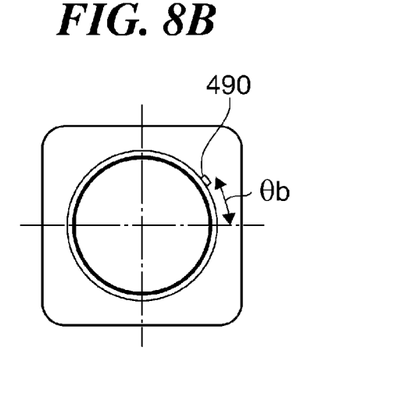

FIG. 8B shows a state where the arm part 490 has been turned about the optical axis, and the bayonet-lug contact surfaces 113a to 113c of the bayonet-lug portions 112a to 112c and the lug contact surfaces 427a to 427c of the lug portions 421a to 421c has started to overlap on the optical axis projection. At this time, an angle through which the arm part 490 has actually been turned (i.e. an angle of rotation of the movable mount part 420) is equal to θb-θa. Note that also in each of FIGS. 8C to 8E, referred to hereinafter, an angle of rotation of the movable mount part 420 relative to the fixed mount part 410 can be determined in the same manner. In the FIG. 8B state, a gap is formed between the bayonet-lug contact surface 113a and the lug contact surface 427a in the optical axis direction, similar to the FIG. 6B state. However, the lug portions of the lens mount 150 and those of the camera-side mount part 110 have overlapped, respectively, on the optical axis projection, which prevents the interchangeable lens 200 from coming off the camera body 100. Therefore, it is desirable that the rotation detection part 480 for switching on/off communication between the first communication contact component 114 and the second communication contact component 440 is disposed at such a location that the communication is turned on after entering the FIG. 8B state.

Figure 8C:
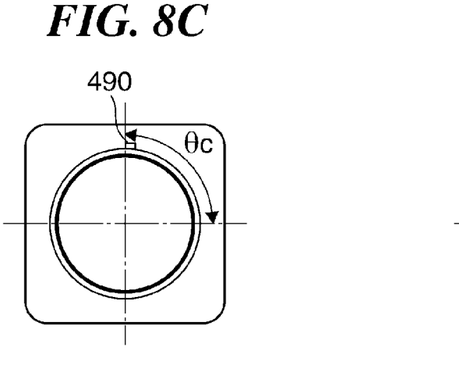

FIG. 8C shows a state where the arm part 490 has been further turned from the FIG. 8B state, and the bayonet-lug contact surfaces 113a to 113c and the lug contact surfaces 427a to 427c have been brought into contact, respectively, with a minimum amount of effectual turning of the arm part 490. An angle θc of the arm part 490 is an angle at which the bayonet-lug contact surfaces 113a to 113c and the lug contact surfaces 427a to 427c are brought into contact with each other, respectively, each with a minimum amount of engagement therebetween. Further, the angle θc of the arm part 490 is an angle at which it is possible to bring the bayonet-lug contact surfaces 113a to 113c and the lug contact surfaces 427a to 427c into contact with each other, respectively, each with a minimum amount of effectual movement of the movable mount part 420 in the optical axis direction. The cases where the FIG. 8C state is realized include a case where the distance α indicated in FIG. 7B is maximized due to a dimensional difference between individual camera-side mount parts 110, and the distance β indicated in FIG. 7B is minimized due to dimensional differences between individual fixed mount parts 410 and between individual movable mount parts 420.

Figure 8D:
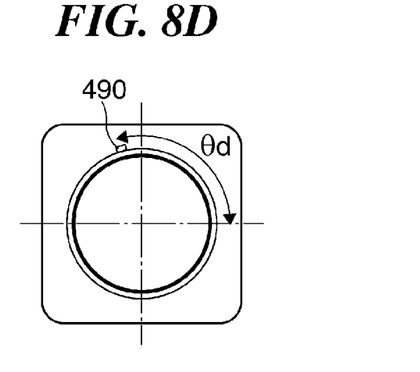

FIG. 8D shows a state where the arm part 490 has been further turned about the optical axis from the FIG. 8B state, and the bayonet-lug contact surfaces 113a to 113c and the lug contact surfaces 427a to 427c have been brought into contact with each other, respectively, with a maximum amount of effectual turning of the arm part 490. An angle θd of the arm part 490 is an angle at which the bayonet-lug contact surfaces 113a to 113c and the lug contact surfaces 427a to 427c are brought into contact with each other, respectively, with a maximum amount of engagement therebetween. The cases where the FIG. 8D state is realized include a case where when the distance α indicated in FIG. 7B is minimized due to a dimensional difference between individual camera-side mount parts 110, and the distance β indicated in FIG. 7B is maximized due to dimensional differences between individual fixed mount parts 410 and between individual movable mount parts 420.

Even if there are dimensional differences between individual lens mounts 150 and between individual camera-side mount parts 110, when the angle of the arm part 490 becomes one of the predetermined angles θc to θd, the bayonet-lug contact surfaces 113a to 113c and the lug contact surfaces 427a to 427c are positively brought into intimate contact with each other, respectively.

Figure 8E:
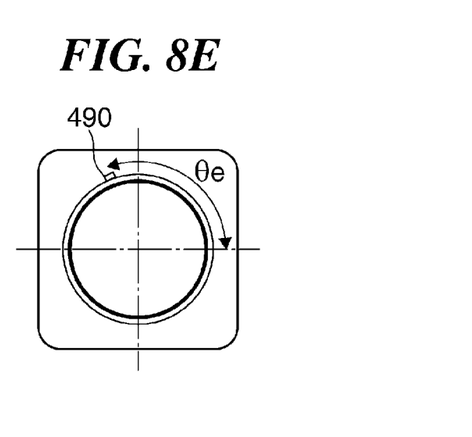

FIG. 8E shows a state where the arm part 490 has been further turned about the optical axis from the 8C or 8D state through a predetermined angle, and the arm-part contact surface 491 of the arm part 490 has been brought into contact with the second contact surface 417 (see FIG. 4B) of the fixed mount part 410. An angle θe of the arm part 490 is a maximum angle to which the arm part 490 can be turned. In the FIG. 8E state, at least one of the camera-side mount part 110, the fixed mount part 410, and the movable mount part 420 has been deformed. Therefore, in order to prevent the deformation of each of the above-mentioned parts from exceeding an elastic deformation range, the second contact surface 417 of the fixed mount part 410 and the arm-part contact surface 491 of the arm part 490 are brought into abutment with each other. By thus restricting the amount of rotation of the movable mount part 420 relative to the fixed mount part 410, it is possible to prevent deformation of the lens mount 150 and the camera-side mount part 110 and breakage of these due to the deformation. On the other hand, it is required to positively couple the interchangeable lens 200 to the camera body 100, and therefore the angle θe is set such that the relationship that the angle θe is not smaller than angle θd (θd≤θe) holds.

As described above, according to the present embodiment, it is possible not only to attach the interchangeable lens 200 to the camera body 100 with a simple structure and by a simple operation, but also to eliminate the play of the interchangeable lens 200 in a state attached to the camera body 100.

Although in the above-described embodiment, the fixing part 210 is described as one of the components of the lens mount 150, the fixing part 210 itself may hold a predetermined lens, and therefore the fixing part 210 can be considered as a component element of a lens barrel as a component of the interchangeable lens 200. In other words, the fixing part 210 is not an essential element for forming the lens mount 150, but can be regarded as a necessary component for forming the interchangeable lens 200 including the lens mount 150.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-023598 filed Feb. 10, 2016 which is hereby incorporated by reference herein in its entirety.

What is claimed is:

1. A lens mount provided in an interchangeable lens as arranged to enable a removable attachment of the interchangeable lens to an image pickup apparatus body including a bayonet-lug portion, the lens mount comprising:
a fixed mount part including a lens-side mount surface arranged to contact a mount surface formed on the image pickup apparatus body and a first screw portion, and configured to be fixed to a fixing portion provided on the interchangeable lens; and
a movable mount part including a lug portion arranged to engage with the bayonet-lug portion and a second screw portion arranged to cooperate with the first screw portion,
wherein when said movable mount part is rotatable about an optical axis from a state in which the mount surface and the lens-side mount surface are in contact with each other and the bayonet-lug portion and said lug portion do not overlap each other, said movable mount part moves toward the fixing portion along the optical axis, as said second screw portion cooperates with said first screw portion, whereby said lug portion is brought into engagement with the bayonet-lug portion, and
wherein the movable mount part moves toward the fixed mount part along the optical axis, as said second screw portion cooperates with said first screw portion.

2. The lens mount according to claim 1, further comprising an arm part arranged to protrude from said movable mount part,
wherein said movable mount part is rotated by turning said arm part.

3. The lens mount according to claim 2, wherein said lug portion is provided on said movable mount part such that said lug portion is engageable with the bayonet-lug portion at a location radially inward of the mount surface and the lens-side mount surface.

4. The lens mount according to claim 2, wherein said fixed mount part has a contact surface which is contactable with said arm part to thereby restrict a movement of said arm part.

5. The lens mount according to claim 4, wherein said fixed mount part has a groove portion formed with a predetermined width, extending along a circumference thereof,
wherein said arm part protrudes from said movable mount part through the groove portion, and
wherein the contact surface is a side surface of a longitudinal end of the groove portion.

6. The lens mount according to claim 5, wherein said arm part is arranged to be brought into contact with the contact surface after having further turned through a predetermined angle from a position where said arm part causes said lug portion and the bayonet-lug portion to be brought into contact with each other.

7. The lens mount according to claim 1, wherein said fixed mount part is provided with a communication contact component for performing electrical communication with the image pickup apparatus body, and a rotation detection part for switching on/off the electrical communication of said communication contact component with the image pickup apparatus body according to a rotation angle through which said movable mount part is rotated, and
wherein said movable mount part is provided with a cutout portion by which said rotation detection part switches on/off the electrical communication of said communication contact component with the image pickup apparatus body.

8. An interchangeable lens including:
a lens mount as claimed in claim 1 and,
a barrel to which the lens mount is fixed.

9. An image pickup apparatus including:
an image pickup apparatus body including a bayonet-lug portion and a mount part having a mount surface, and
an interchangeable lens as claimed in claim 8.

* * * * *